A. B. DAVIS.

Weighing-Apparatus.

No. 6,346. Reissued March 23, 1875.

Witnesses:

L. F. Brous.

A. P. Grant.

Inventor:

A. B. Davis.

by John A. Wiedersheim

Atty.

THE GRAPHIC CO. PHOTO-LITH. 39 & 41 PARK PLACE, N.Y.

UNITED STATES PATENT OFFICE.

AUGUSTUS B. DAVIS, OF PHILADELPHIA, PENNSYLVANIA.

IMPROVEMENT IN WEIGHING APPARATUS.

Specification forming part of Letters Patent No. 37,569, dated February 3, 1863; reissue No. 6,346, dated March 23, 1875; application filed November 11, 1874.

DIVISION A.

*To all whom it may concern:*

Be it known that I, AUGUSTUS B. DAVIS, of the city and county of Philadelphia, and the State of Pennsylvania, have invented a new and useful Improvement in Weighing Apparatus; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
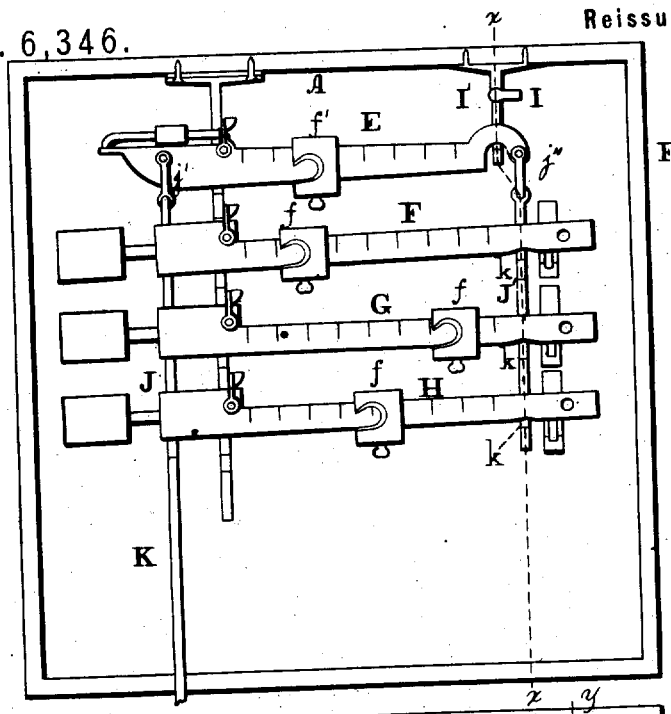
Figure 3:
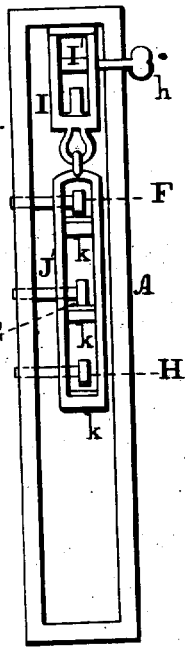
Figure 2:
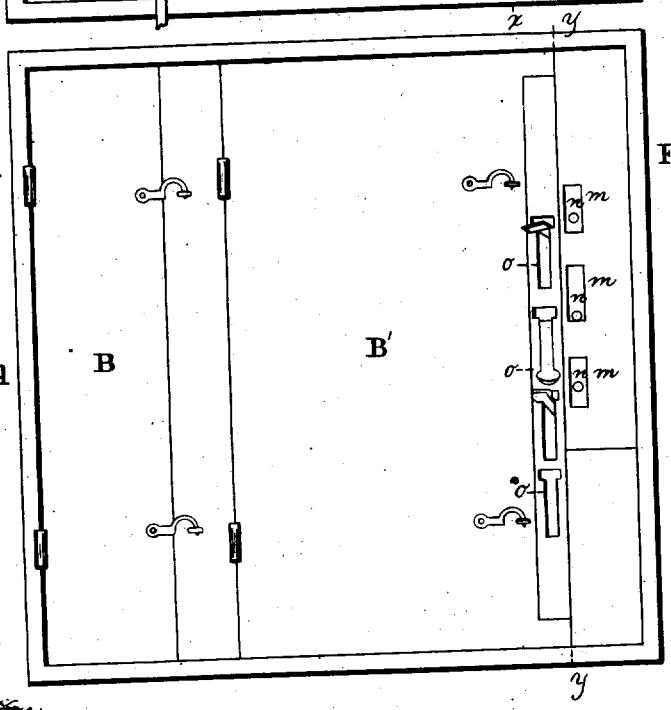
Figure 4:
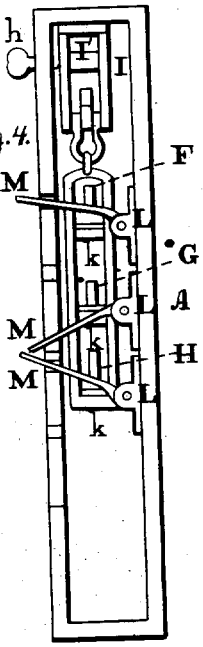

Figure 1 is a front view, partly in section, of the device embodying my invention. Fig. 2 is an exterior front view. Fig. 3 is a transverse vertical section in line *x x*, Fig. 1. Fig. 4 is a similar view in line *y y*, Fig. 2.

Similar letters of reference indicate corresponding parts in the several figures.

My invention relates to a many-weight scale, or to a weighing apparatus wherein a desired quantity of different substances can be readily and accurately ascertained without any adjustment or alteration of the apparatus; and it consists in a box or casing furnished with doors, and having such openings that, while the attendant can observe the movements of the weighing-beams from the outside of the casing, he cannot gain access to the beams themselves, or gain a knowledge of the weight determined by the beams.

Referring to the drawings, A represents a box or casing, to which are hinged doors B B′, and which I denominate as a "secret box." Within the casing there is suspended the weighing-beam E. From the beam E is suspended a clevis, *j′*, to which is connected a yoke, J, which, continued into the rod K, is connected to the levers of an adjacent platform-scale. The front end of the weighing-beam E passes through a hanger, I, which, secured to the top of the box, is furnished with a pawl, I′, connected to a rod, *h*, which passes through the front of the box, and which, on the outside of the latter, is furnished with a suitable handle. *f f f* represent a series of weights of what may be termed an auxiliary weighing apparatus, said weights being adjustably fitted on the holders F G H, which are suspended from a support, D. From the front ends of the weighing-beam E is suspended, by a clevis, *j″*, a stirrup, J′, which consists of a plate, having openings separated from each other by cross-bars *k*, on which the weight-holders F G H are adapted to come to a bearing. L L L are brackets secured to the back of the box, and to each bracket is hung a lever, M, each lever passing through a T-formed slot, *o*, in front of the box, and each lever being so arranged in respect to one of the weight-holders F, G, or H that, when the lever is elevated so as to occupy a position in the top of one of the slots, it will support one of the holders in a position elevated above one of the cross-bars *k* of the stirrup. When, however, the lever is lowered, so as to bear on the bottom of the slot, the holder will rest on one of the said cross-bars. From each of the holders F, G, and H a pin, *n*, projects through a slot, *m*, in front of the box, and near each slot the name of the material to be weighed by the weight adjacent to that slot is painted or otherwise marked, the material in the present instance being coal, iron, and stone, as shown in Fig. 2.

Although my invention is applicable generally to the weighing of different materials of given but different proportions, to be subsequently mixed together, it is especially well adapted to the weighing of the coal, ore, and stone or flux used in the manufacture of iron. I shall, therefore, confine my description of the operation of the apparatus in connection with this branch of industry.

In manufacturing cast-iron it has been the practice, in some instances, to use one beam or scale to weigh the different materials to be deposited in the furnace, and to alter the weights to suit the different quantities of these materials. In other instances as many beams or scales are used as there are materials to be weighed. In both cases delay, as well as inaccuracies, must take place, the scales or beams being exposed and the adjustment of the weights under the control of the unskilled laborers, who wheel the materials in a barrow onto the platform, and who, through ignorance or carelessness, may alter or tamper with the scales, and consequently discharge into the furnace improper proportions of the different materials.

The beam E is similar to those of other weighing apparatus, and is arranged to balance, or, rather, indicate, the weight of the car or wheelbarrow in which the materials to be weighed are contained. In other words, this beam is arranged to indicate the tare, the holders F G H being arranged to indicate the weight of the stone or flux, respectively.

In using my improved weighing apparatus the first step to take is to ascertain the weight of the cars or barrows in which the material to be weighed is contained. If three barrows be used—one weighing ninety-five, a second ninety-nine, and a third one hundred and six, pounds—the weight $f'$ on the beam E is adjusted to and secured in such a position on the said beam as to balance one hundred pounds, that being the average weight of the barrows. If, to make a particular quality of iron, four hundred pounds of coal and one one hundred pounds of stone and flux are required for three hundred pounds of ore, the weights $f$ are adjusted on the several holders in the proper position for weighing these amounts. The weights having been thus regulated by the manager or responsible superintendent of the furnace, he closes the two doors B and B′, and locks them, so that no one but himself can obtain access to the interior of the box, and alter the position of the weights.

Preparatory to the weighing of the materials the pawl I is turned down, so as to prevent unnecessary agitation of the scale, and the whole of the levers M are elevated, so that the holders F, G, and H may be raised free from contact with the cross-bars $k$ of the stirrup J′.

Supposing that a barrow or car load of ore be now wheeled onto the platform of the weighing apparatus, the pawl I is, in the first instance, turned up, so as to set the beam E at liberty; then the lever M below the holder G is lowered, so that the latter may rest on one of the cross-bars of the stirrup J′, when it is at once in a position to operate in unison with the beam E, the other holders, F and H, remaining stationary and disconnected from the said beam E.

After thus lowering the lever M and holder G, the attendant watches the pin $n$, which projects from the said holder; and if the pin, by taking a position midway, or thereabout, between the top and bottom of the slot $m$, through which it passes, shows that the holder G is balanced, the load of ore is of the desired weight. If the load be deficient in weight, the pin will strike the bottom of the slot, and if the weight be excessive, the pin will strike the top of the slot, thereby instructing the attendant whether to add to or abstract from the load.

The proper quantities of coal or stone can in like manner be readily ascertained by placing loads of the same on the platform, and then lowering the holders F or H onto the cross-bars of the stirrup.

It will now be seen that the desired weight of any number of different ingredients can be ascertained by using a corresponding number of holders, and without any adjustment of the weights.

As the laborer who places the materials on the platform cannot gain access to the weights, and has no further knowledge of the weight indicated by the pins $n$ than that the weight, whatever it may be, is sufficient, there can be no tampering with or ignorant or careless handling of the weights, the latter remaining fixed until the superintendent in charge of the keys of the box or case alters the weights, when a change in the proportion of the ingredients is demanded by the condition of the furnace, or a proposed change in the quality of iron to be manufactured.

The device may be used with advantage in rapidly and accurately weighing any desired quantity of different ingredients to be subsequently mixed together, as, for instance, the different substances of which many paint compounds are composed, different ingredients for dyeing, &c.

Having thus described my invention, what I claim as new, and desire to secure by Letters Patent, is—

1. The combination, with a many-weight scale, consisting of a main weighing-beam and auxiliary weighing apparatus, of a box or casing furnished with doors, and having such openings that, while the attendant can observe the operation of the auxiliary apparatus from the outside of the casing, he cannot gain access to the apparatus itself, or gain a knowledge of the weight determined by said apparatus.

2. A box or casing containing a main weighing-beam and an auxiliary weighing apparatus, and provided with levers or equivalents, for the auxiliary weighing apparatus to be thrown in and out of connection with the main beam without allowing access to the apparatus itself, or imparting knowledge of the weight determined by said apparatus.

A. B. DAVIS.

Witnesses:

JOHN A. WIEDERSHEIM,

A. P. GRANT.